Oct. 26, 1948.  G. S. SMALL  2,452,159

SPECTACLES WITH READILY REMOVABLE LENSES

Filed May 28, 1945

INVENTOR.
GILTNER S SMALL
BY
Charles M Fryer
ATTORNEY

Patented Oct. 26, 1948

2,452,159

UNITED STATES PATENT OFFICE 2,452,159

SPECTACLES WITH READILY REMOVABLE LENSES

Giltner S. Small, Sacramento, Calif.

Application May 28, 1945, Serial No. 596,171

6 Claims. (Cl. 88—41)

The present invention relates to spectacles and particularly to spectacles with readily removable lenses.

Considerable thought is currently given to the appearance of spectacles and the design and color of spectacle frames are selected for their aesthetic value and for their suitability to the features and coloring of the particular wearer. This gives rise to a requirement of spectacles of a great variety of colors and many persons desire to own spectacles of different colors to produce harmonious effects with different accouterments of dress and for different occasions. The lenses of spectacles represent a large portion of their cost and it is therefore desirable to have a single pair of lenses which may be used with several frames of different colors, materials or styles. It is also sometimes desirable to have more than one pair of lenses for use with the frames so that tinted lenses may be substituted for clear ones when the use of dark glasses are in order for protection of the eyes against unusually bright light.

It is therefore an object of the present invention to provide spectacle frames from which the lenses may be readily removed and replaced. A further object of the invention is the provision of spectacle frames having lenses that are removable and replaceable by simple means without the necessity of using any tool and without changing the normal appearance of the spectacles as they are worn. A further object of the invention is to provide spectacles with removable lenses having retaining means for retaining the lenses in the frames and locking means to prevent accidental opening of the retaining means, particularly while the spectacles are being worn. Further and more specific objects and advantages of the invention are made apparent in the following specification wherein the invention is described in detail by reference to the accompanying drawings.

Figure 1:
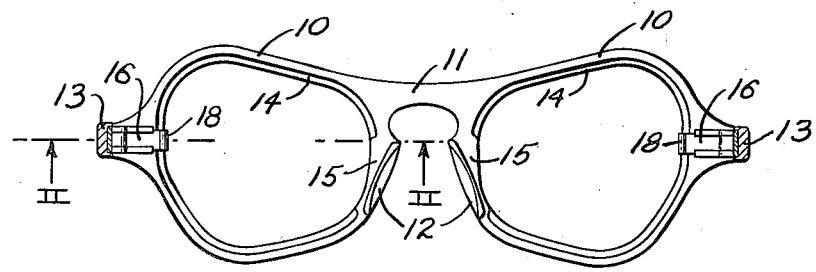
Fig. 1 is a view in elevation of a pair of spectacles embodying the present invention shown with the lenses removed and from the side worn closest to the face, the temple members of the spectacles being shown in section.

The spectacles shown in the drawings are of the type usually made of plastic material which is obtainable in a variety of colors though it is to be understood that various materials may be used and the design of the frames may be varied without limit so long as the lens receiving portions are of the same shape so that the lenses may be changed from one frame to another.

The spectacles shown in the drawings comprise lens frames 10 connected by a bridge 11 and having the usual nose pads 12 and temples 13 which are hinged to the frame and which though only partially shown in the drawings extend rearwardly from the frames to engage the ears or head of the wearer to hold the spectacles in place before the eyes.

In spectacles of this kind a continuous groove is usually formed in the lens frame for the reception of the edge of the lens which is permanently held in place. The lenses are secured in plastic frames usually by heating and shrinking the frames about them and in metal frames by clamping action employing a screw which tightens the frames around the lenses.

Figure 2:
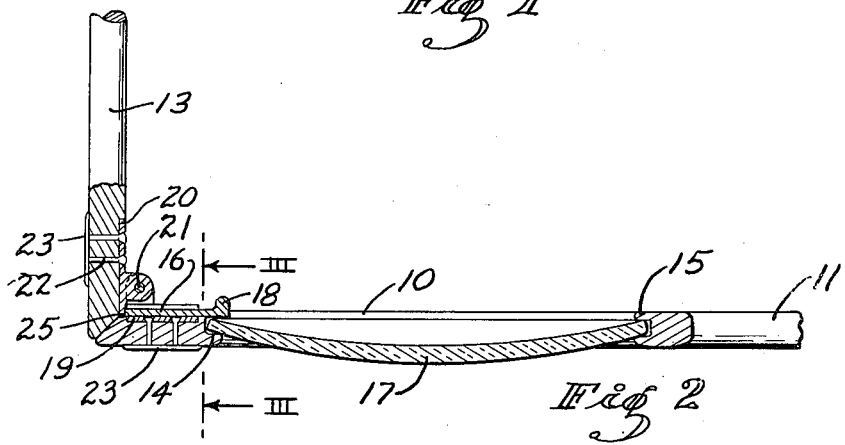
Fig. 2 is an enlarged sectional view taken on the line 2—2 of Fig. 1.

In the present invention, the conventional groove is omitted and replaced by a shoulder 14 which permits the lenses to be placed in the frames from one side without the necessity of shrinking or clamping means. The lenses are held in place within the frames by means of a flange 15 which is provided at one side of each lens frame and which is preferably arranged at the inner side, or that side closest to the nose pads 12. A slidable retaining member 16 is disposed at the opposite side of each frame and is adapted to be moved to and from its retaining position in which it is shown in both Figs. 1 and 2. The lens as shown at 17 in Fig. 2 is therefore inserted in the frame by first placing one edge under the flange 15 and then permitting the entire marginal edge of the lens to come to rest on the shoulder 14. The slidable retaining member 16 is then drawn to its retaining position and to facilitate its sliding movement it is provided with a raised portion or rib 18 adjacent its projecting end for engagement by the finger used in sliding it.

Figure 3:
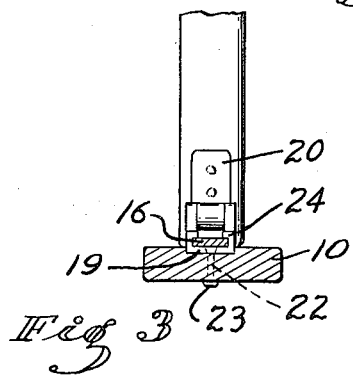
Fig. 3 is a section taken on the line 3—3 of Fig. 2.

The lens may as readily be removed from the frame by retracting the retaining member 16 and lifting the lens and drawing it out from beneath the flange 15. The sliding member 16 may be suitably guided for its sliding movement by any conventional form of guide. However, the present invention includes the provision of a guide which is made as a part of the hinge which connects the temple with the frame and is so combined with such hinge that the sliding retaining member is positively locked in its retaining position when the temples are disposed at right angles to the spectacle frames, or in the position which they assume when the spectacles are being worn. Consequently, it is impossible for the sliding retaining member to be retracted so that the lenses can be dislodged from their frames while the glasses are being worn. This is accomplished by the structure best illustrated in Figs. 2 and 3 where the frames and temples are shown as connected by a hinge which includes a frame hinge part 19 and a temple hinge part 20 pivotally connected by a pintle 21. Each of the hinge parts is conventionally connected with the spectacles by rivets 22, two of which are usually provided for each hinge part and joined together at one end by a decorative plate 23. The opposite ends of the rivets are peened into tapered holes in the hinge parts. To provide for the sliding reception of the retaining member 16 the frame hinge part 19 is formed with upwardly and inwardly turned edges 24 which form a channel embracing the retainer 16. The temple hinge part 20 is provided with a tail 25 which extends beyond its point of pivotal connection with the frame hinge part and when the temple is disposed in the position shown, which is substantially at a right angle to the frame or the position assumed by the temple when the spectacles are worn, the tail 25 occupies the position shown thereby obstructing retraction of the retaining member 16. Therefore, it is impossible for this member to be retracted accidentally while the spectacles are being worn. In order to remove the lenses from the frames, it is necessary for the spectacles first to be removed from the face and for the temples then to be swung toward their folded position so that in pivoting about the pintle 21 the tail 25 of the temple hinge part 20 will be moved out of its obstructing position to permit retraction of the retaining member 16 and removal of the lenses.

With the construction shown, therefore, spectacles are provided with readily removable lenses so that a single pair of lenses ground for optical correction required by an individual may be readily used with many frames of different color and design. Furthermore, different lenses ground or tinted for different purposes may also be used in the same frames and the removable lenses are securely retained in the frame by means which may be easily manipulated without special skill or tools and by means which are positively locked to prevent accidental dislodgement of the lenses while the spectacles are being worn.

I claim:

1. A pair of spectacles comprising lens frames, temples, hinges connecting said temples and frames and each including a frame hinge part and a temple hinge part pivoted thereto, a shoulder in each lens frame for removably supporting a lens, a flange at one side of each frame for holding one edge of the lens against the shoulder, a slidable lens retaining member guided in the frame hinge part for movement to an extended position overlying an opposite edge of the lens, and a member on the temple hinge part adapted to obstruct retraction of the retaining member when the temple is substantially at a right angle to the frame.

2. In spectacles with removable lenses having lens frames and temples hinged thereto, a shoulder in each lens frame for supporting a lens therein, a flange at one side of the frame for retaining the lens against the shoulder, and a slidably mounted retaining member carried by the temple hinge structure at the opposite side of the frame adapted to project over an edge of the lens to retain it against the shoulder and to be retracted to a position permitting removal of the lens.

3. In spectacles with removable lenses having lens frames with temples hinged thereto, the combination of a slidably mounted lens retaining member adapted to project over an edge of each lens and to be retracted to a position permitting removal of the lens, and means on the temple to obstruct retraction of the projected lens retaining member when the temple is substantially at right angles to the frame.

4. In spectacles with removable lenses having lens frames with temples hinged thereto, the combination of a slidable lens retaining member guided in the temple hinge structure for movement to an extended position overlying an edge of the lens and adapted to be retracted to a position permitting removal of the lens, and a member on the temple hinge structure adapted to obstruct retraction of the lens retaining member when the temple is substantially at a right angle to the frame.

5. In spectacles with removable lenses having lens frames and temples hinged thereto, a shoulder in each lens frame for supporting a lens therein, a flange at one side of the frame for retaining the lens against the shoulder, a slidably mounted retaining member at the opposite side of the frame adapted to project over an edge of the lens to retain it against the shoulder and adapted to be retracted to a position permitting removal of the lens, and means on the temple to obstruct retraction of the slidable lens retaining member when the temple is substantially at a right angle to the frame.

6. In spectacles with removable lenses having lens frames and temples hinged thereto, a shoulder in each lens frame for supporting a lens therein, a flange at one side of the frame for retaining the lens against the shoulder, a slidably mounted retaining member at the opposite side of the frame adapted to project over an edge of the lens to retain it against the shoulder and adapted to be retracted to a position permitting removal of the lens, and a member on the temple hinge structure adapted to obstruct retraction of the slidable lens retaining member when the temple is substantially at a right angle to the frame.

GILTNER S. SMALL.

REFERENCES CITED

The following references are of record in the file of this patent:

UNITED STATES PATENTS

| Number | Name | Date |
| --- | --- | --- |
| 924,327 | Dow | June 8, 1909 |
| 1,168,832 | Smernoff | Jan. 18, 1916 |
| 1,518,385 | Boutelle | Dec. 9, 1924 |
| 2,045,916 | Martin | June 30, 1936 |
| 2,362,002 | Gluck | Nov. 7, 1944 |

FOREIGN PATENTS

| Number | Country | Date |
| --- | --- | --- |
| 463,000 | Great Britain | Mar. 19, 1937 |